US008422086B2

(12) United States Patent
Baba

(10) Patent No.: US 8,422,086 B2
(45) Date of Patent: Apr. 16, 2013

(54) IMAGE PROCESSING APPARATUS AND METHOD USING DIFFERENT SCALING METHODS FOR SCANNING

(75) Inventor: Hiroyuki Baba, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 838 days.

(21) Appl. No.: 12/582,767

(22) Filed: Oct. 21, 2009

(65) Prior Publication Data

US 2010/0110499 A1 May 6, 2010

(30) Foreign Application Priority Data

Nov. 5, 2008 (JP) ................................. 2008-284395

(51) Int. Cl.
*H04N 1/04* (2006.01)

(52) U.S. Cl.
USPC ............ 358/474; 358/486; 358/496; 358/498

(58) Field of Classification Search ........................ None
See application file for complete search history.

(56) References Cited

U.S. PATENT DOCUMENTS

| | | | | |
|---|---|---|---|---|
| 6,233,068 B1 * | 5/2001 | Kondo | ........................... | 358/498 |
| 6,234,470 B1 * | 5/2001 | Okitsu et al. | ................... | 271/114 |
| 6,289,119 B1 * | 9/2001 | Nagata | ........................... | 382/162 |
| 7,345,794 B2 * | 3/2008 | Matsui | ........................... | 358/474 |
| 7,518,755 B2 * | 4/2009 | Gotoh et al. | ................... | 358/3.06 |
| 7,684,091 B2 * | 3/2010 | Takata et al. | ................... | 358/474 |
| 7,746,523 B2 * | 6/2010 | Kim | ............................... | 358/498 |
| 8,004,728 B2 * | 8/2011 | Sugiura | .......................... | 358/498 |
| 8,059,314 B2 * | 11/2011 | Ishido | ............................ | 358/474 |
| 2004/0114202 A1 * | 6/2004 | Ogata | ............................ | 358/498 |
| 2008/0175622 A1 * | 7/2008 | Hashizume et al. | .......... | 399/208 |
| 2008/0224391 A1 * | 9/2008 | Oshima | ..................... | 271/265.01 |
| 2011/0205604 A1 * | 8/2011 | Imaizumi et al. | ............. | 358/498 |

FOREIGN PATENT DOCUMENTS

| | | | |
|---|---|---|---|
| JP | 9-46484 A | | 2/1997 |
| JP | 2002-77596 A | | 3/2002 |
| JP | 2002-314801 | | 10/2002 |
| JP | 2002314801 A | * | 10/2002 |
| JP | 2005-175824 A | | 6/2005 |
| JP | 2007-145541 A | | 6/2007 |
| JP | 4132555 | | 6/2008 |
| JP | 2008-263388 A | | 10/2008 |

OTHER PUBLICATIONS

Office Action issued Sep. 4, 2012, in Japanese Patent Application No. 2008-284395.

* cited by examiner

*Primary Examiner* — Dung Tran
(74) *Attorney, Agent, or Firm* — Oblon, Spivak, McClelland, Maier & Neustadt, L.L.P.

(57) ABSTRACT

An image processing apparatus includes an auto document feeder, and can simultaneously scans both sides of an original at a fixed scan position during one-time original feed. The image processing apparatus further includes a first scanning unit that scans a front side of the original in a single-sided scan and a double-sided scan; and a second scanning unit that scans a back side of the original in the double-sided scan. In the double-sided scan, the first scanning unit and the second scanning unit scan the original by using the same scaling method. The first scanning unit uses different scaling methods between the single-sided scan and the double-sided scan based on an original scan condition.

20 Claims, 13 Drawing Sheets

E.G., WHEN "3" IS INPUT, CORRESPONDING "D003" IS OUTPUT

IMAGE PROCESSING APPARATUS AND METHOD USING DIFFERENT SCALING METHODS FOR SCANNING

CROSS-REFERENCE TO RELATED APPLICATIONS

The present application claims priority to and incorporates by reference the entire contents of Japanese Patent Application No. 2008-284395 filed in Japan on Nov. 5, 2008.

BACKGROUND OF THE INVENTION

1. Field of the Invention

The present invention relates to an image processing apparatus that scans both sides of an original during one-time original feed.

2. Description of the Related Art

An image processing apparatus equipped with an auto document feeder (ADF) is in widespread use. The ADF is mounted in a scanner unit of the image processing apparatus, and it automatically feeds originals one by one. In recent years, an image processing apparatus capable of scanning both sides of an original during one-time original feed has been developed.

In some image processing apparatuses, a user can set a scale factor used to scale up/down an image to be scanned. Then, image scanning is performed by controlling a scale factor in a sub-scanning direction based on the set scale factor. In this method, the scale factor in only the sub-scanning direction adjusted by changing the resolution in the sub-scanning direction. Thereafter, interpolate or reduction of scanned image data obtained in this manner is performed to achieve digital scaling. However, this method has a problem that the higher the scale factor set by the user is, the larger the amount of image data to be scanned gets.

In general, in an image processing apparatus, such as a digital copier, the scanned image data is temporarily stored first in a buffer memory. The image data is then compressed and the compressed image data is stored in an image memory. Meanwhile, in an image processing apparatus equipped with an ADF, in a series of operations from when each of originals automatically-fed by the ADF is scanned till when compressed image data is stored in the image memory, if the image memory becomes full while the originals are scanned, no more data can be stored in the image memory. Therefore, until compression of scanned image data during one-time original feed and storage of compressed image data in the compressed image memory are properly completed, the whole scanned image data is stored in the buffer memory.

However, this method has a problem that when both sides of an original are to be scanned, and a high scale factor is set, a large-capacity buffer memory is required, which leads to an increase in cost.

Japanese Patent Application Laid-open No. 2002-314801, for example, discloses a solution to this problem. In a single-sided scan, a scaled image is obtained by using a scaling method of changing a document feed speed of an ADF. On the other hand, in a double-sided simultaneous scan, an amount of image data is estimated from the size of the original to be scanned and a specified scale factor, it is determined if the image data can be stored in a buffer memory, and if the image data cannot be stored in the buffer memory, the original is scanned at the same magnification (i.e., a scale factor of 1), and then, the image data stored in the buffer memory is digitally scaled at the specified scale factor.

However, in the technology disclosed in Japanese Patent Application Laid-open No. 2002-314801, the scaling method may differ between the single-sided scan and the double-sided scan, and thus an image quality may differ between the single-sided scan and the double-sided scan. In this technology, a case where the scaling method differs between the single-sided scan and the double-sided scan is explained below.

The buffer memory shall have available space corresponding to image data of two pages of originals scanned at the same magnification (100% a scaling). First, in a case of a single-sided original, when 200% scaling is specified, a scaling method A is employed. The scaling method A is 200% scaling (performed by a primary resolution converting unit)× 100% scaling (performed by a secondary resolution converting unit). Incidentally, a document feed speed is twice as fast as a document feed speed in 100% scaling. Hereinafter, the document feed speed in 100% scaling is referred to as a 1× speed, and a double speed of the 1× speed is referred to as a 2× speed.

On the other hand, in a case of a double-sided original, when 200% scaling is specified, a scaling method B is employed. The scaling method B is 100% scaling (performed by the primary resolution converting unit)×200% scaling (performed by the secondary resolution converting unit). Incidentally, a document feed speed is fixed at the 1× speed.

The primary resolution converting unit performs scaling on image data by changing the document feed speed of the ADF, and obtains a scaled image. For example, to obtain a 200% scaled image, the primary resolution converting unit changes the document feed speed of the ADF to the 2× speed. The secondary resolution converting unit performs scaling on image data with a scaling circuit composed of an electrical circuit without changing the document feed speed of the ADF, i.e., with the document feed speed fixed at the 1× speed.

In general, when the scaling method differs, an image quality of a scanned image also differs. When the scaling method differs between the single-sided scan and the double-sided scan, and especially, when an original is a halftone photo, moire appears on a scanned image, i.e., the effect of the scaling method is significant. On the other hand, when an original is composed mainly of a text, even if the scaling method is switched between the single-sided scan and the double-sided scan, there is little difference in image quality (appearance of moire). In this manner, a degree of the effect is different depending on a type of original.

In addition to the above problems, there is a need for improvement in scan productivity at least in the single-sided scan with the scaling methods switched between the single-sided scan and the double-sided scan. In this case also, in the technology disclosed in Japanese Patent Application Laid-open No. 2002-314801, as the scaling method differs between the single-sided scan and the double-sided scan, an image quality may differ between the single-sided scan and the double-sided scan.

A contact image sensor (CIS), which is sometimes used for a back-sided scan in a double-sided simultaneous scan, accommodates only a scan at the same magnification. Thus, the CIS may not accommodate the scaling method for obtaining a scaled image by changing the document feed speed of the ADF. Furthermore, depending on a configuration of the scanner unit, in the double-sided scan, an original may be scanned at the same magnification constantly.

For example, in the single-sided scan, it is possible to accommodate the scaling by changing the document feed speed of the ADF; however, in the double-sided scan, only a scan at the same magnification is available due to constraints of the CIS. In other words, when 50% scaling is specified, and originals is a mixture of a single-sided original and a double-sided original, the scaling method differs between the single-sided original and the double-sided original.

SUMMARY OF THE INVENTION

It is an object of the present invention to at least partially solve the problems in the conventional technology.

According to an aspect of the present invention, there is provided an image processing apparatus that includes an auto document feeder, and simultaneously scans both sides of an original at a fixed scan position during one-time original feed. The image processing apparatus includes an operating unit configured to receive an input; a first scanning unit configured to scan a front side of the original in a single-sided scan and a double-sided scan; and a second scanning unit configured to scan a back side of the original in the double-sided scan. In the double-sided scan, the first scanning unit and the second scanning unit scan the original by using the same scaling method. The first scanning unit uses different scaling methods between the single-sided scan and the double-sided scan based on an original scan condition.

According to another aspect of the present invention, there is provided an image processing method implemented on an image processing apparatus that includes an auto document feeder, and simultaneously scans both sides of an original at a fixed scan position during one-time original feed, an operating unit configured to receive an input, a first scanning unit configured to scan a front side of the original in a single-sided scan and a double-sided scan, and a second scanning unit configured to scan a back side of the original in the double-sided scan. The image processing method includes, in the double-sided scan, scanning the original with the first scanning unit and the second scanning unit by using the same scaling method, and scanning the original with the first scanning unit by using different scaling methods between the single-sided scan and the double-sided scan based on an original scan condition.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. Incidentally, a color multifunction peripheral (MFP) is described below as an example of an image processing apparatus. However, application of the present invention is not limited to the color MFP.

Figure 1:
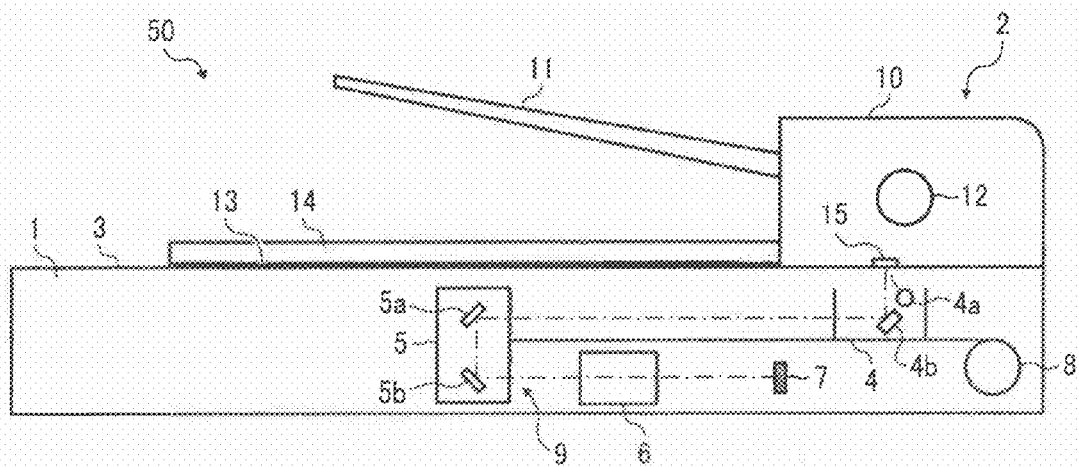
FIG. 1 is a schematic diagram illustrating a schematic configuration example of an image reading unit of an image processing apparatus according to an embodiment of the present invention.

FIG. 1 illustrates a schematic configuration example of an image reading unit 50 of the color MFP according to an embodiment of the present invention. The MFP includes an image writing unit that has not been shown in FIG. 1.

The image reading unit 50 includes three parts: a main body 1, an original feed unit 2, and a platen 3.

An exposure scanning optical system 9 is arranged in the main body 1. The exposure scanning optical system 9 includes a first carriage 4, a second carriage 5, a lens 6, a one-dimensional photoelectric conversion element 7, and a stepping motor 8.

The first carriage 4 includes a light source 4a and a mirror 4b. The light source 4a is composed of a xenon lamp or a fluorescent lamp. The second carriage 5 includes mirrors 5a and 5b. In the present embodiment, the one-dimensional photoelectric conversion element 7 is a color-reading three-line charge-coupled device (CCD) sensor. Hereinafter, the one-dimensional photoelectric conversion element 7 is referred to as the CCD 7. The stepping motor 8 drives the first carriage 4 and the second carriage 5.

The original feed unit 2 includes a sheet document feeder (SDF) unit 10 and an original tray 11. A stepping motor 12 for feeding an original is provided in the SDF unit 10.

An original cover plate 14 is rotatably provided on top of the platen 3. An original 13 is set under the original cover plate 14. A reference white board 15 for a shading correction is arranged at an end of the platen 3.

Figure 2:
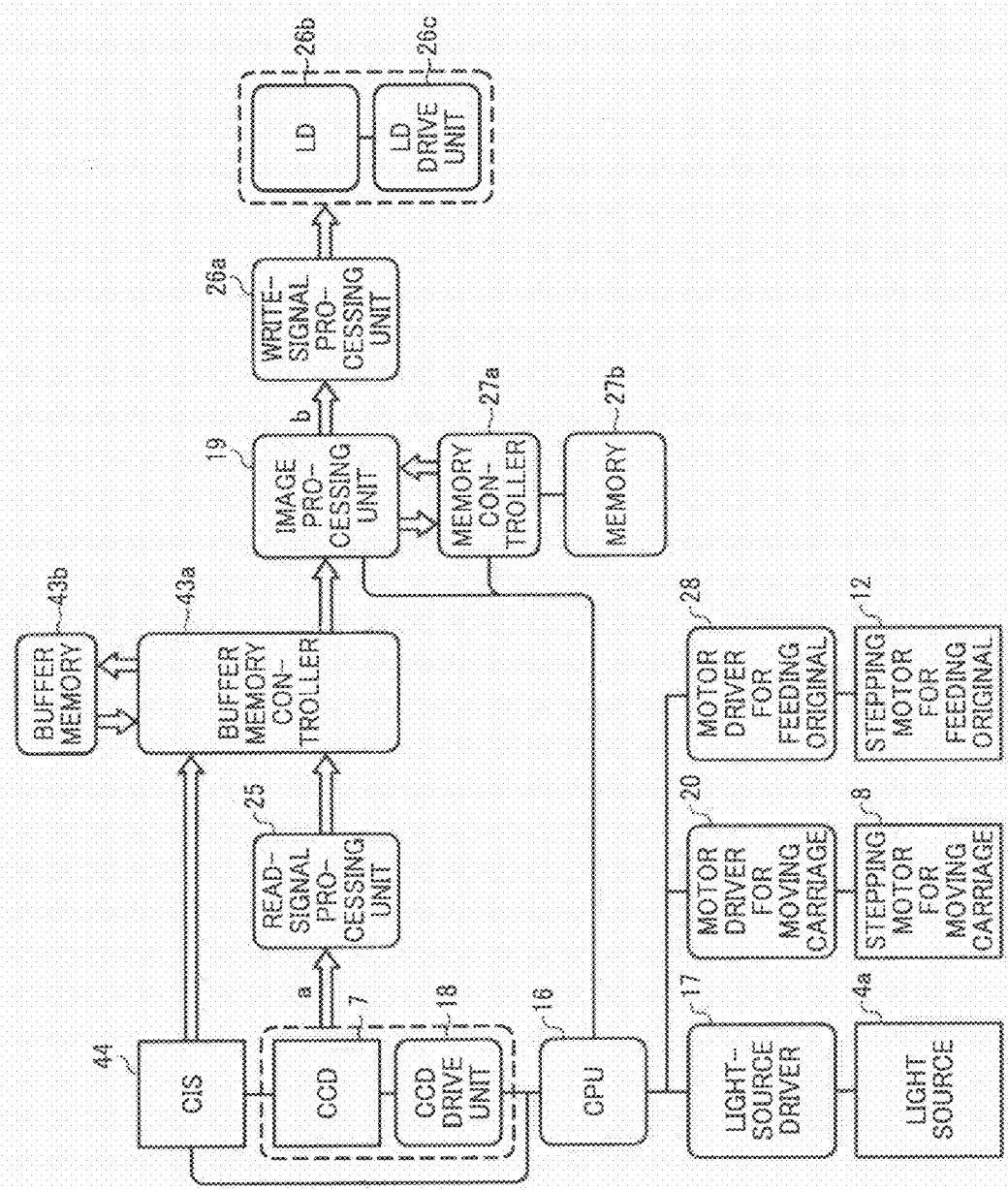
FIG. 2 is a functional block diagram of an electric control unit of the image reading unit.

FIG. 2 is a block diagram illustrating an example of an electric control unit of the image reading unit 50. As shown in FIG. 2, the electric control unit includes the light source 4a, the CCD 7, the stepping motor 8 for moving the carriage, the stepping motor 12 for feeding an original, a control central processing unit (CPU) 16, a light-source driver 17, a CCD drive unit 18, an image processing unit 19, a motor driver 20 for moving the carriage, a read-signal processing unit 25, a write-signal processing unit 26a, a laser diode (LD) 26b, an LD drive unit 26c, a memory 27b, a memory controller 27a, a motor driver 28 for feeding an original, a buffer memory controller 43a, a buffer memory 43b, and a CIS 44.

Figure 3:
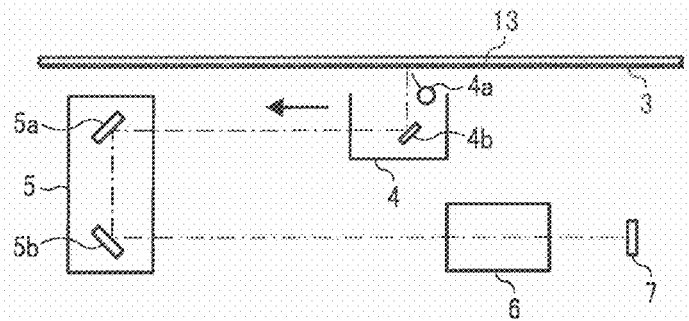
FIG. 3 is an enlarged view of a portion of the image reading unit that is in a platen scan mode.
Figure 4:
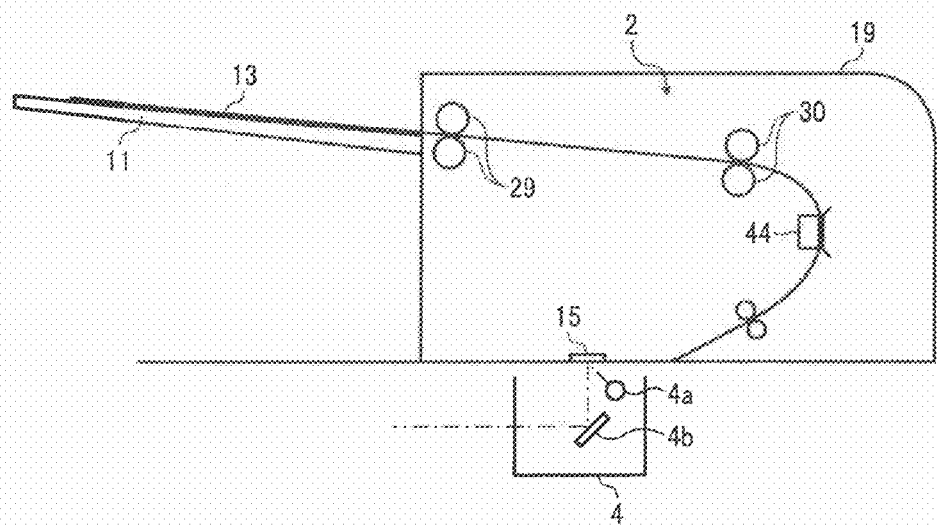
FIG. 4 is an enlarged view of the image reading unit that is in an original feed/scan mode.

FIG. 3 is a schematic diagram illustrating a situation where the image reading unit 50 in a platen scan mode. FIG. 4 is a schematic diagram illustrating a situation where the image reading unit 50 in an original feed/scan mode. An original scan mode has two types: the platen scan mode and the original feed/scan mode. In the platen scan mode, as shown in FIG. 3, the original 13 put on the platen 3 is scanned. In the original feed/scan mode, as shown in FIG. 4, the original 13 that is fed by the original feed unit 2 at a fixed scan position is scanned.

A basic operation for scanning an original in the platen scan mode is explained below with reference to FIG. 3.

First, when the original 13 is set on the platen 3 under the original cover plate 14, the CPU 16 activates the light-source driver 17 to turn on the light source 4a. The CCD 7 driven by the CCD drive unit 18 scans the reference white board 15, and an analog-to-digital (A/D) converter (not shown) in the image processing unit 19 performs an A/D conversion on scanned image data of the reference white board 15. The read-signal processing unit 25 stores the digitalized image data as white reference data for a shading correction in a random access memory (RAM) (corresponding to a line buffer 36 shown in FIG. 6) in a shading-correction processing unit of the image processing unit 19.

Then, the CPU 16 activates the motor driver 20 to drive the stepping motor 8, and the stepping motor 8 drives the first carriage 4 to move along the original 13. The first carriage 4 scans a surface of the original 13 at a constant speed, and image data of the original 13 is subjected to a photoelectric conversion by the CCD 7.

A basic operation for scanning an original in a sheet-through type document feeder (DF) scan mode (the original feed/scan mode) is explained below with reference to FIG. 4. Unlike the platen scan mode described above, in which an original is fixedly set on the platen and scanned by the moving carriage, in the sheet-through type DF scan mode, in a state where the first carriage 4 stands still at the fixed scan position, the first carriage 4 scans an original being conveyed.

First, in the same manner as in the platen scan mode, the reference white board 15 is scanned by moving the first carriage 4 a predetermined travel distance. After that, the CPU 16 causes the first carriage 4 to move to a sheet-through original scan position and stand still at the sheet-through original scan position.

Then, to feed the original 13, the CPU 16 activates the motor driver 28 to drive the stepping motor 12. The original 13 set in the original tray 11 is fed to the predetermined scan position of the first carriage 4 by a separation roller 29 and a conveyance roller 30. When the original 13 arrives at the scan position of the first carriage 4, the original 13 is conveyed at a constant speed. While the original 13 passes by the first carriage 4 being in the static condition, image data of a surface of the original 13 is subjected to a photoelectric conversion by the CCD 7.

The operations described above are made when a single-sided original is scanned. When a double-sided original is scanned, after the original passes by the conveyance roller 30, when the original passes by the CIS 44, a back side of the original is scanned.

Figure 5:
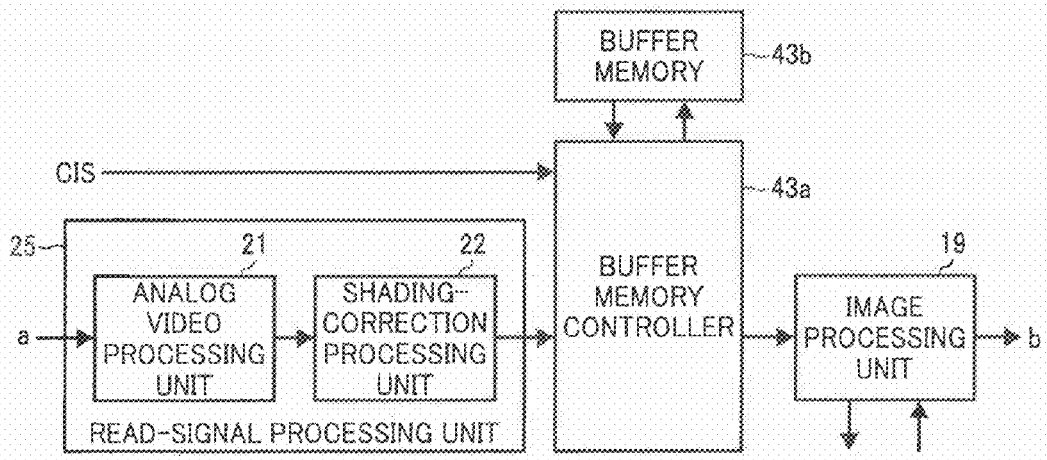
FIG. 5 is a block diagram illustrating an example of the most basic configuration of a read-signal processing unit shown in FIG. 2.

FIG. 5 is a block diagram illustrating an example of the most basic configuration of the read-signal processing unit 25 shown in FIG. 2. The read-signal processing unit 25 includes an analog video processing unit 21 and a shading-correction processing unit 22. The read-signal processing unit 25 outputs data to the image processing unit 19 through the buffer memory controller 43a that controls the buffer memory 43b.

An analog video signal [a] subjected to the photoelectric conversion is subjected to a digital conversion by the analog video processing unit 21, and then subjected to a shading correction by the shading-correction processing unit 22. After that, the image data is temporarily stored in the buffer memory 43b through the buffer memory controller 43a. Afterwards, data on an image on a per-page basis is output to the image processing unit 19 in a subsequent stage.

The buffer memory controller 43a simultaneously receives a front-side image transmitted from the CCD 7 and a back-side image transmitted from the CIS 44, and stores image data on two pages of the images in the buffer memory 43b.

After that, the buffer memory 43b alternately outputs the front-side image from the CCD 7 and the back-side image from the CIS 44 as one-page image data to the image processing unit 19 in the subsequent stage. The image processing unit 19 performs various image processing on the image with respect to each page transmitted from the buffer memory controller 43a.

Figure 6:
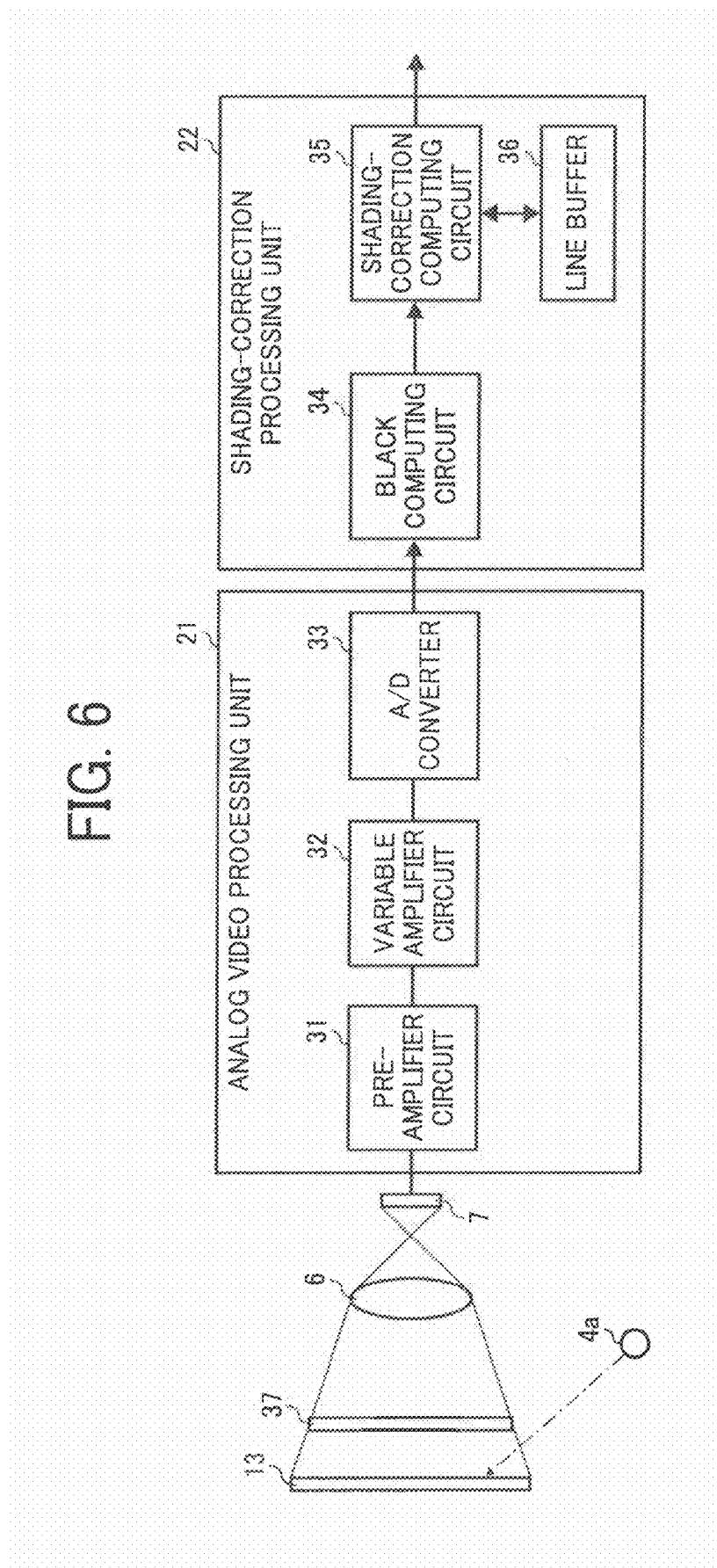
FIG. 6 is a schematic diagram for explaining analog processing performed by the image processing apparatus.

FIG. 6 is a schematic diagram for explaining analog processing performed in the color MFP. Details of the analog processing are explained below with reference to FIG. 6.

As shown in FIG. 6, the analog video processing unit 21 shown in FIG. 5 includes a preamplifier circuit 31, a variable amplifier circuit 32, and an A/D converter 33. The shading-correction processing unit 22 includes a black computing circuit 34, a shading-correction computing circuit 35, and the line buffer 36.

The line buffer 36 stores therein the above-described white reference data used as a reference in a shading correction. The light source 4a emits a light to the original 13 on the platen 3. A reflected light from the original 13 passes through a shading adjustment plate 37, and is focused on the CCD 7 by the lens 6. The shading adjustment plate 37 serves to adjust a light intensity of the reflected light to reduce a difference in light intensity of the reflected light between an end portion and a center portion of the CCD 7. This is because if there is a significant difference in light intensity of the reflected light between the end portion and the center portion of the CCD 7, a result of the computing by the shading-correction processing unit 22 probably includes an error, so that a shading-correction computing process is performed after the difference in light intensity of the reflected light is reduced in advance.

Incidentally, for the sake of simplicity, a mirror for reflecting the reflected light has been omitted from FIG. 6. Furthermore, the image data from the CIS 44 is image data that has been subjected to the same process as that is performed on the image data from the CCD 7 by the read-signal processing unit 25, and thus it is not necessary to perform the analog video process or the shading correction process on the data from the CIS 44.

Figure 7:
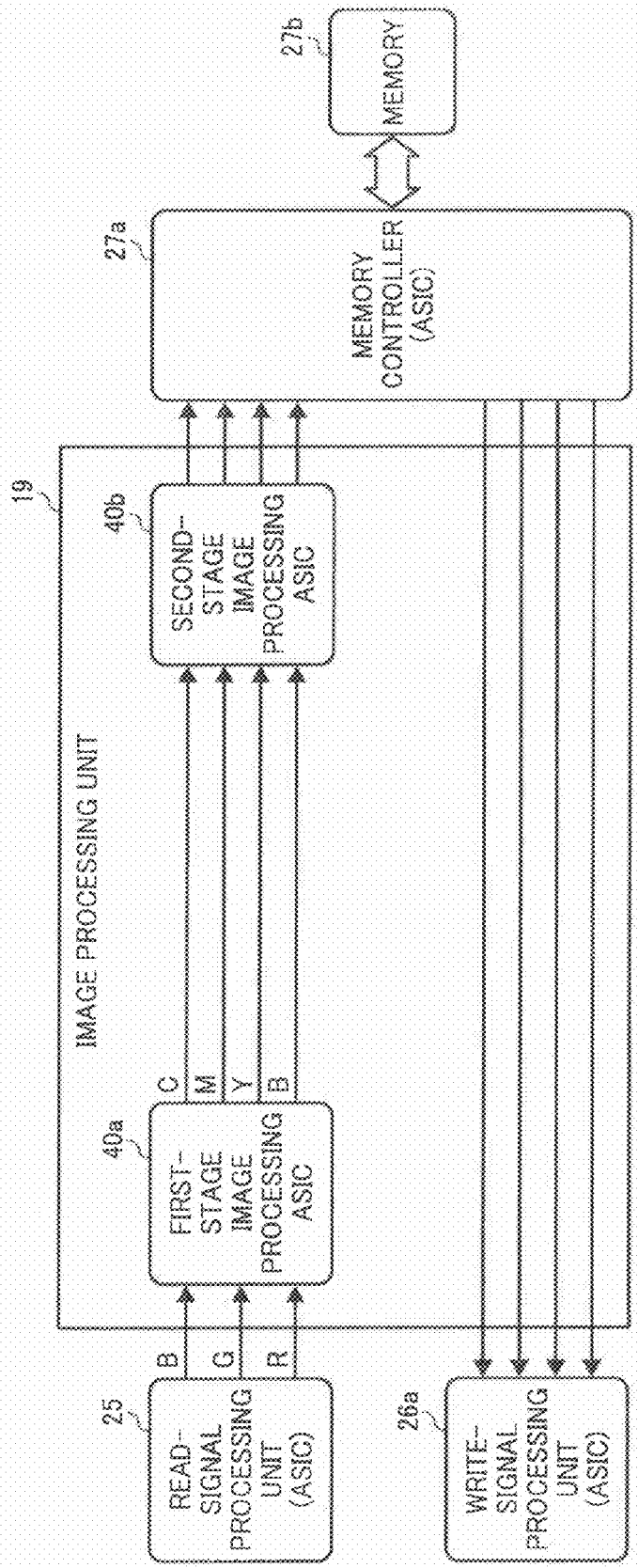
FIG. 7 is a schematic diagram illustrating a configuration example of an image processing unit of the image processing apparatus.

As shown in FIG. 7, the image processing unit 19 shown in FIG. 5 includes a first-stage image processing ASIC 40a and a second-stage image processing ASIC 40b.

Figure 8:
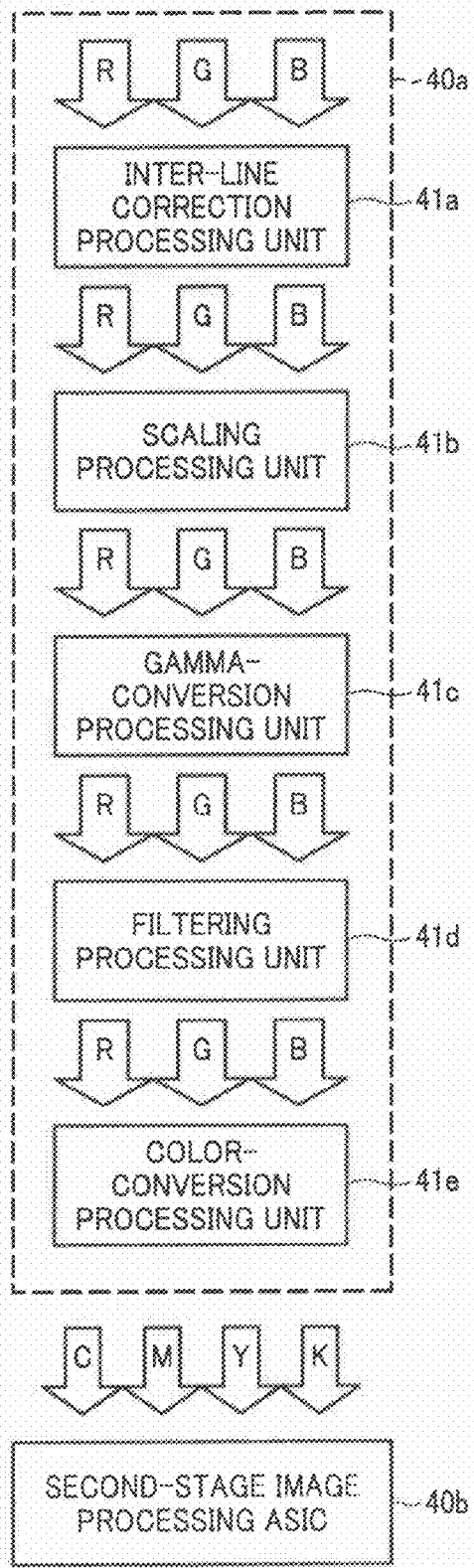
FIG. 8 is a schematic diagram illustrating a first-stage image processing application specific integrated circuit (ASIC) of the image processing unit shown in FIG. 7.

As shown in FIG. 8, the first-stage image processing ASIC 40a includes an inter-line correction processing unit 41a, a scaling processing unit 41b, a gamma-conversion processing unit 41c, a filtering processing unit 41d, and a color-conversion processing unit 41e. The inter-line correction processing unit 41a, the scaling processing unit 41b, the gamma-conversion processing unit 41c, the filtering processing unit 41d, and the color-conversion processing unit 41e perform an inter-line correction process, a scaling process, a gamma conversion process, a filtering process, and a color conversion process, respectively.

The inter-line correction process performed by the inter-line correction processing unit 41a is a process for correcting a line misalignment between red (R), green (G), and blue (B) lines caused by a difference in mounting positions of R, G, and B line sensors of the CCD 7. For example, when the B line is used as a reference, a line misalignment between the R and B lines and a line misalignment between the G and B lines are corrected.

Figure 10:
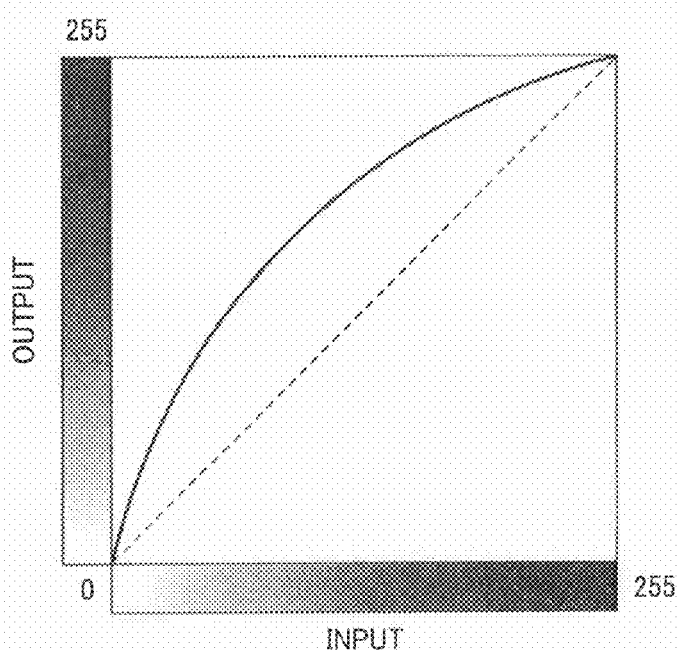
FIG. 10 is a graph for explaining density adjustment in a gamma conversion process performed by a gamma-conversion processing unit shown in FIG. 8.
Figure 11:
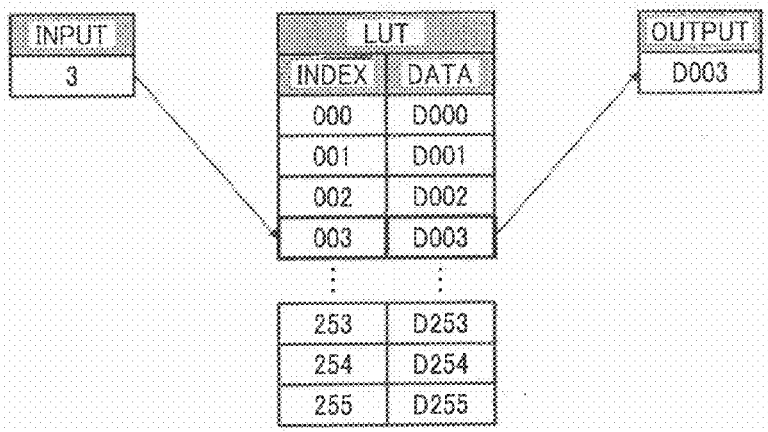
FIG. 11 is a schematic diagram illustrating an example of a look-up table used in the gamma conversion process.

The scaling process performed by the scaling processing unit 41b is a process for converting the resolution of scanned image data into a desired resolution. The gamma conversion process performed by the gamma-conversion processing unit 41c is a conversion process mainly for a density adjustment (for example, such a density adjustment as shown in FIG. 10). Generally, a so-called look-up table conversion method as shown in FIG. 11 is used in the gamma conversion.

The filtering process performed by the filtering processing unit 41d is a filtering operation for a modulation transfer function (MTF) correction, sharpening, and smoothing. The color conversion process performed by the color-conversion processing unit 41e is a process for converting the color space of the image data into a color space of an output device, for example, the cyan/magenta/yellow/black (CMYK) color space. Incidentally, when the image data is a color image, the above process is performed on each of RGB components. When the image data is a black-and-white image, the above process is performed on a component only with a G data path. When second-stage image processing is performed before data storage, a gradation level is usually set low with the emphasis on minimizing a storage capacity. In this example, a gradation conversion process for converting the image data into binary data is selected.

There is described a gradation conversion by the application of fixed-threshold binarization when a writing unit is capable of outputting 1-bit image data with up to 2 gradation levels.

Figure 9:
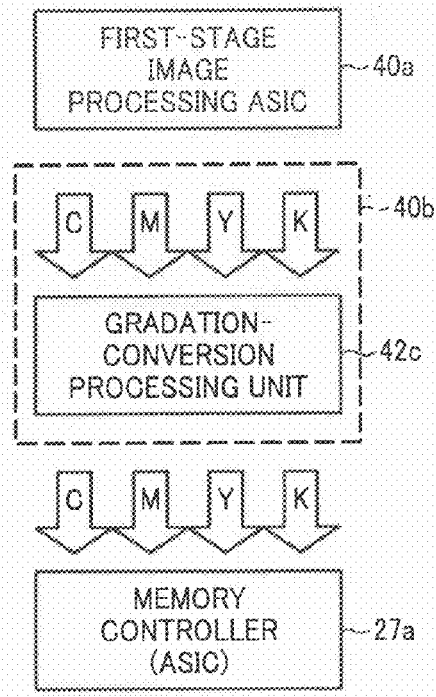
FIG. 9 is a schematic diagram illustrating a second-stage image processing ASIC of the image processing unit shown in FIG. 7.

When a binary image is requested, a gradation-conversion processing unit 42c of the second-stage image processing ASIC 40b shown in FIG. 9 performs a gradation conversion process to convert each of 8-bit 256-level CMYK image data into 2-level binary image data, and outputs the binary image data as image data [b] to a subsequent stage. For ease in explanation, an example of the fixed-threshold binarization is described below. When a binarization threshold is 128, binarization is performed on pixel data of image data input to the processing unit under the following conditions:

If "0≦pixel data<128" is true, convert pixel data into 0; and
If "128≦pixel data≦255" is true, convert pixel data into 1.

Subsequently, there is described a gradation conversion by the application of fixed-threshold quaternarization when the writing unit is capable of outputting 2-bit image data with up to 4 gradation levels.

When a quaternary image is requested, the gradation-conversion processing unit 42c of the second-stage image processing ASIC 40b shown in FIG. 9 performs a gradation conversion process to convert each of 8-bit 256-level CMYK image data into 4-level quaternary image data, and outputs the quaternary image data as image data [b] to a subsequent stage. For ease in explanation, an example of the fixed-threshold quaternarization is described below. The quaternarization is performed on pixel data of image data input to the processing unit under the following conditions:

If "0≦pixel data<64" is true, convert pixel data into 0;
If "64≦pixel data<128" is true, convert pixel data into 1;
If "128≦pixel data<192" is true, convert pixel data into 2; and
If "192≦pixel data≦255" is true, convert pixel data into 3.

The image data described above is 1-bit, or 2-bit, image data for each of CYMK images before being subjected to the gradation process. The image data is temporarily accumulated in the memory 27b through the memory controller 27a.

Figure 12:
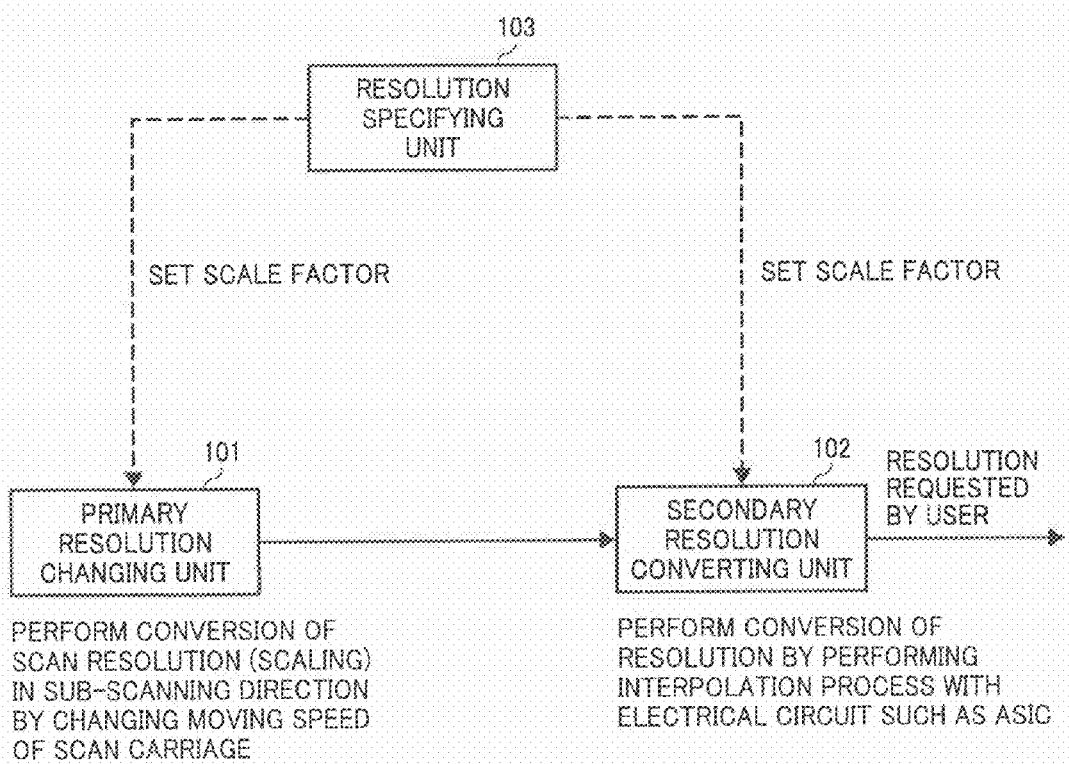
FIG. 12 is a schematic diagram illustrating an example of the operation of the image processing apparatus.

FIG. 12 illustrates an example of the operation of the image processing apparatus according to the present embodiment. The image processing apparatus according to the present embodiment includes a primary resolution changing unit 101, a secondary resolution converting unit 102, and a resolution specifying unit 103.

The primary resolution changing unit 101 changes the scan resolution in the sub-scanning direction (i.e., performs scaling) by changing the document feed speed. The primary resolution changing unit 101 is composed of the light-source driver 17, the motor driver 20, the motor driver 28, and the like.

The secondary resolution converting unit 102 performs a resolution conversion in a main scanning direction and the sub-scanning direction by performing an interpolation process with an electrical circuit such as an ASIC. The secondary resolution converting unit 102 is composed of the scaling processing unit 41b in the image processing unit 19, and is a module that performs scaling in the main scanning direction and the sub-scanning direction.

The resolution specifying unit 103 specifies a scale factor (the resolution) with respect to the primary resolution changing unit 101 and the secondary resolution converting unit 102. The resolution specifying unit 103 is a module composed of the CPU 16. Incidentally, the resolution in the sub-scanning direction at the same magnification (100% scaling) shall be 600 dots per inch (dpi), and the document feed speed of the ADF at this time is referred to as "the 1× speed". Furthermore, the resolution in the main scanning direction at the same magnification shall be also 600 dpi. The activation of the CCD 7 is controlled on the basis of the operation at this resolution.

Figure 13:
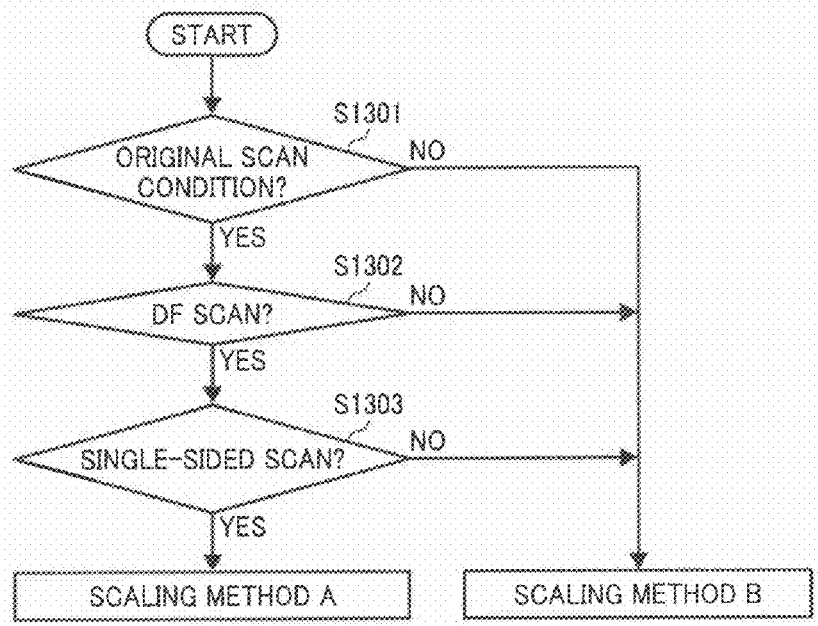
FIG. 13 is a flowchart of an example of the operation of the image processing apparatus.
Figure 14:
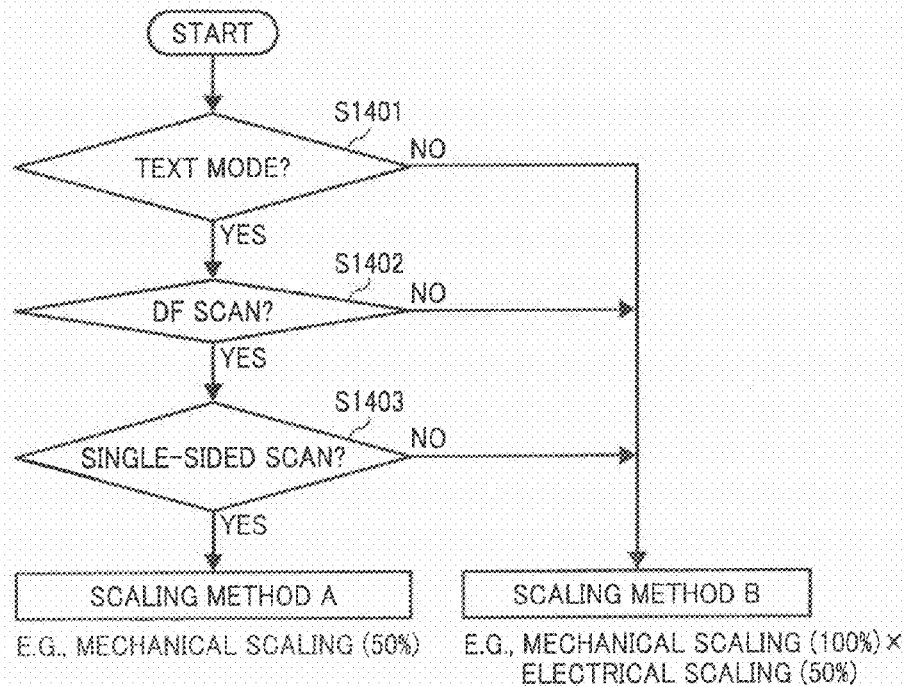
FIG. 14 is a flowchart of another example of the operation of the image processing apparatus.

FIGS. 13 and 14 illustrate examples of the operation of the image processing apparatus according to the present embodiment. It is assumed that, in the image reading unit 50, the CCD resolution in the main scanning direction and the resolution in the sub-scanning direction at the same magnification are set at 600 dpi. Moreover, it is assumed that the user has specified the resolution of 300 dpi. For the resolution 300 dpi, there are two scaling methods as follows:

Scaling method A: Emphasis on productivity
Primary resolution changing unit: 50% scaling [scanning at 300 dpi] (2× speed)
Secondary resolution converting unit: 100% scaling
Scaling method B: Emphasis on image quality
Primary resolution changing unit: 100% scaling [scanning at 600 dpi] (1× speed)
Secondary resolution converting unit: 50% scaling An original scan condition for switching between the scaling methods in the present embodiment is a type of original. An example of operation procedures until image data of the original is obtained in the present embodiment is briefly described below.

First, a user selects a scan resolution and a type of original through an operating unit (not shown), and specifies whether the original is a single-sided original or a double-sided original through the operating unit. The user sets a plurality of sheet-like originals in the original tray of the ADF. After that, the user presses a "SCAN START" button on the operation panel, and the image processing apparatus starts scanning the originals.

A case where the scaling method A is selected is explained below.

Figure 15:
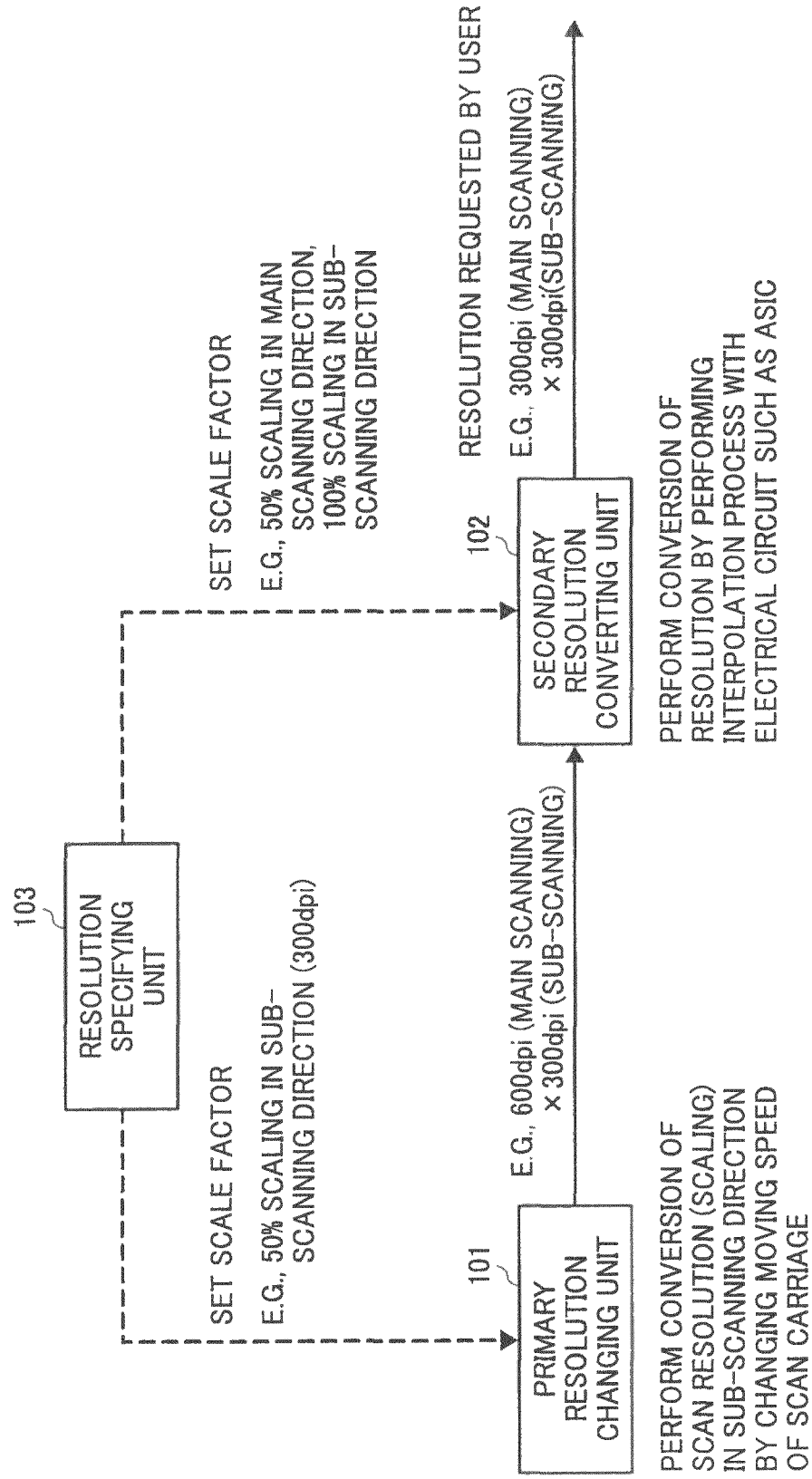
FIG. 15 is an explanatory diagram of an example of a case where a scaling method is selected in the image processing apparatus.

FIG. 15 is an explanatory diagram of an example of the case where the scaling method A is selected. It is assumed that the resolutions of image data in the main scanning direction and the sub-scanning direction requested by the user are both 300 dpi, a text mode is specified as a type of original, and the single-sided originals set in the ADF are to be scanned.

The resolution specifying unit 103 sets the primary resolution changing unit 101 to control the ADF to feed the originals at the 2× speed. Furthermore, the resolution specifying unit 103 sets the secondary resolution converting unit 102 to perform 100% scaling in the sub-scanning direction. The originals fed one by one at the 2× speed are sequentially scanned, and scanned image data of each original is image data of 600 dpi (main scanning)×300 dpi (sub-scanning).

Then, the secondary resolution converting unit 102 does not perform scaling in the sub-scanning direction, but performs 50% scaling in the main scanning direction only on the image data (i.e., conversion of the resolution in the main scanning direction to 300 dpi) with the electrical circuit, and transfers image data of 300 dpi (main scanning)×300 dpi (sub-scanning) to the subsequent stage. The scanning productivity at this time is about twice as high as the productivity in the scaling method B (emphasis on image quality) to be described later. In other words, the originals can be scanned in about half the time it takes in the scaling method B. Incidentally, the scanning productivity is not exactly twice as high as the productivity in the scaling method B because it takes some time to feed each original to the scan position and discharge the original in practice.

Subsequently, a case where the scaling method B is selected is explained below.

Figure 16:
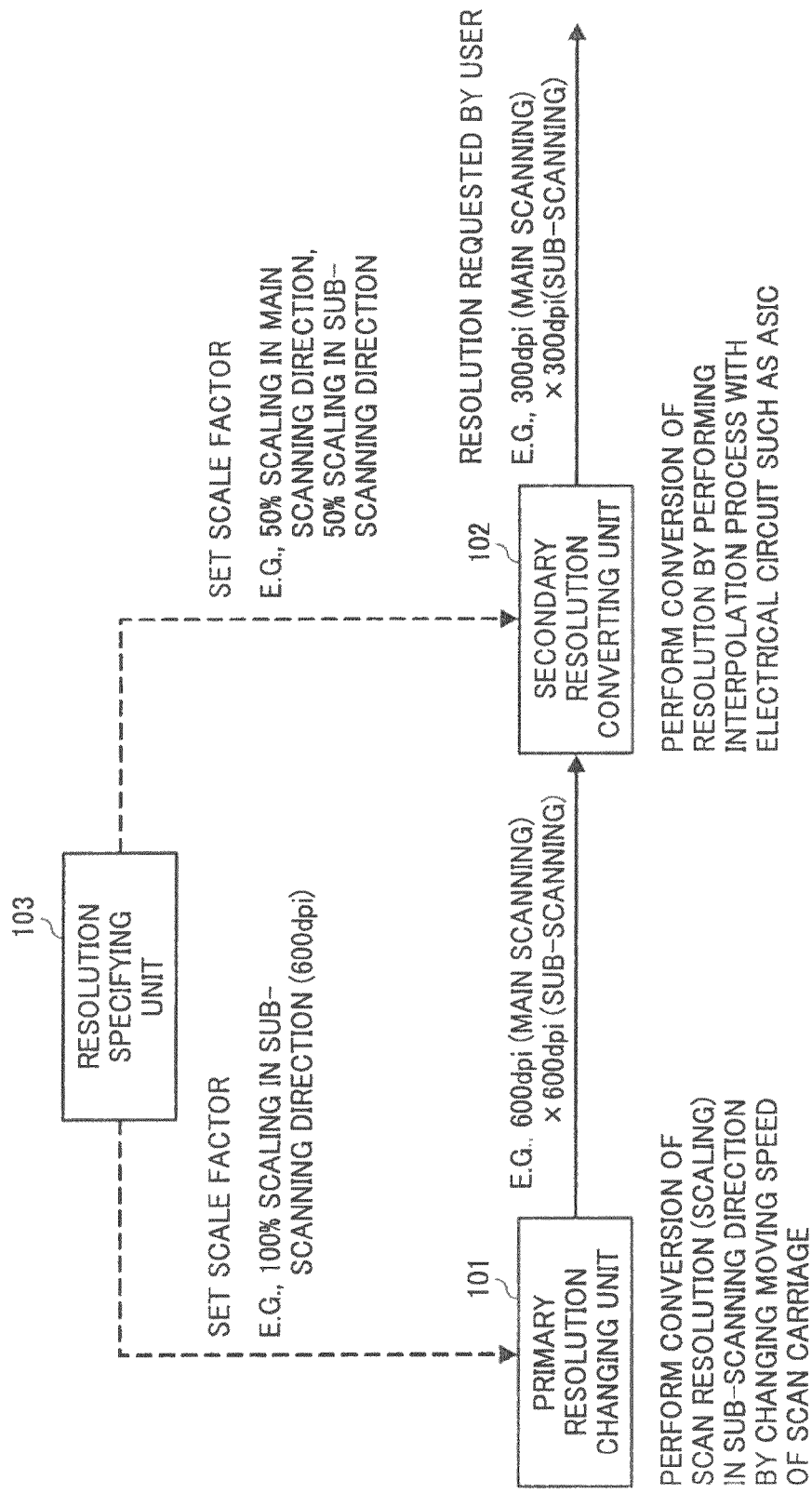
FIG. 16 is an explanatory diagram of an example of a case where another scaling method is selected in the image processing apparatus.

FIG. 16 is an explanatory diagram of an example of the case where the scaling method B is selected. It is assumed that the resolutions of image data in the main scanning direction and the sub-scanning direction requested by the user are both 300 dpi, a photo mode is specified as a type of original, and the single-sided originals set in the ADF are to be scanned.

As shown in FIG. 14, when the specified type of original is not the text mode (NO at Step S1401), the scaling method B is selected. As shown in FIG. 16, when the scaling method B is selected, the resolution specifying unit 103 sets the primary resolution changing unit 101 to set the document feed speed of the image reading unit at the 1× speed. Furthermore, the resolution specifying unit 103 sets the secondary resolution converting unit 102 to perform 50% scaling in the sub-scanning direction. The originals fed one by one at the 1× speed are sequentially scanned, and scanned image data of each original is image data of 600 dpi (main scanning)×600 dpi (sub-scanning). After the secondary resolution converting unit 102 performs 50% scaling in the sub-scanning direction on the image data to convert the image data into image data of 300 dpi (main scanning)×300 dpi (sub-scanning), and transfers the image data of 300 dpi (main scanning)×300 dpi (sub-scanning) to the subsequent stage.

The scanning productivity at this time is about half the productivity in the scaling method A (emphasis on productivity) described above. In other words, it takes about twice as long to scan the originals as the time taken in the scaling method A. Incidentally, the scanning productivity is not exactly half the productivity in the scaling method A because it takes some time to feed each original to the scan position and discharge the original in practice.

In the present embodiment, an original scan condition for switching between scaling methods shall be that originals are "a mixture of a single-sided original and a double-sided original". The operation of the image processing apparatus in this condition is explained below with reference to a flowchart shown in FIG. 13. In the present embodiment, the resolution specified by a user shall be 300 dpi. When the specified resolution is 300 dpi, there are two scaling methods as follows.

Scaling method A: Emphasis on productivity
Primary resolution changing unit: 50% scaling [scanning at 300 dpi] (2× speed)
Secondary resolution converting unit: 100% scaling
Scaling method B: Emphasis on image quality
Primary resolution changing unit: 100% scaling [scanning at 600 dpi] (1× speed)
Secondary resolution converting unit: 50% scaling The original scan condition for switching between the scaling methods in the present embodiment is when originals are a mixture of a single-sided original and a double-sided original. Scanned images of a set of a plurality of originals, i.e., a batch of originals set in the original tray are most likely compared with one another. Thus, even when the originals are a mixture of a single-sided original and a double-sided original, scanned images of the single-sided original and the double-sided original preferably have the same image quality. When the originals are all double-sided originals or all single-sided originals, scanned images of the originals are less likely compared with one another.

An example of operation procedures until image data of the originals is obtained in the present embodiment is briefly described below. A user selects a scan resolution through the operating unit (not shown), and specifies whether originals are a mixture of a single-sided original and a double-sided original through the operating unit. The user sets a plurality of sheet-like originals in the original tray of the ADF. After that, the user presses the "SCAN START" button on the operation panel, and the image processing apparatus starts scanning the originals.

A case where the scaling method A is selected is explained below with reference to FIG. 15.

It is assumed that the resolutions of image data in the main scanning direction and the sub-scanning direction requested by the user are both 300 dpi, "a mixture of a single-sided original and a double-sided original" is not specified, and the originals set in the ADF are to be scanned. When "a mixture of a single-sided original and a double-sided original" is not specified, the originals are all single-sided originals or all double-sided originals. In the present embodiment, it is assumed that the originals are all single-sided originals.

The resolution specifying unit 103 sets the primary resolution changing unit 101 to control the ADF to feed the originals at the 2× speed. Furthermore, the resolution specifying unit 103 sets the secondary resolution converting unit 102 to perform 100% scaling in the sub-scanning direction. The originals fed one by one at the 2× speed are sequentially scanned, and scanned image data of each original is image data of 600 dpi (main scanning)×300 dpi (sub-scanning).

Then, the secondary resolution converting unit does not perform scaling in the sub-scanning direction, but performs 50% scaling in the main scanning direction only on the image data (i.e., conversion of the resolution in the main scanning direction to 300 dpi) with the electrical circuit, and transfers image data of 300 dpi (main scanning)×300 dpi (sub-scanning) to the subsequent stage.

Subsequently, a case where the scaling method B is selected is explained below with reference to FIG. 16.

It is assumed that the resolutions of image data in the main scanning direction and the sub-scanning direction requested by the user are both 300 dpi, "a mixture of a single-sided original and a double-sided original" is not specified, and the originals set in the ADF are to be scanned.

Incidentally, when "a mixture of a single-sided original and a double-sided original" is specified, the originals set in the original tray are a mixture of a single-sided original and a double-sided original. In a case of a mixture of a single-sided original and a double-sided original, the scaling method B is applied to both the single-sided original and the double-sided original. In the case of a mixture of a single-sided original and a double-sided original, even when the original is a single-sided original, both sides of the single-sided original are scanned in the same manner as a double-sided original. When scanned image data is a blank image, the data is discarded. In this manner, when a mixture of a single-sided original and a double-sided original is scanned, both sides of each of the originals are scanned regardless of whether the original is a single-sided original or a double-sided original. When "a mixture of a single-sided original and a double-sided original" is specified, the resolution specifying unit 103 performs operation settings for the scaling method B.

The resolution specifying unit 103 sets the primary resolution changing unit 101 to set the document feed speed of the image reading unit at the 1× speed. Furthermore, the resolution specifying unit 103 sets the secondary resolution converting unit 102 to perform 50% scaling in the sub-scanning direction.

The originals fed one by one at the 1× speed are sequentially scanned, and scanned image data of each original is image data of 600 dpi (main scanning)×600 dpi (sub-scanning). After the secondary resolution converting unit 102 performs 50% scaling in the sub-scanning direction on the image data to convert the image data into image data of 300 dpi (main scanning)×300 dpi (sub-scanning), and transfers the image data of 300 dpi (main scanning)×300 dpi (sub-scanning) to the subsequent stage. Incidentally, the same operation described above is performed regardless of whether the original is a single-sided original or a double-sided original.

In the first and second embodiments described above, depending on an original scan condition, the scaling methods of a single-sided original and a double-sided original are switched, so that it is possible to achieve both an improvement in scanning productivity and a reduction of a difference in image quality between a single-sided scan and a double-sided scan. Furthermore, a user need not consider a degree of the effect on image quality due to the different scaling methods among originals, and thus it is possible to improve user-friendliness.

Moreover, when originals are composed mainly of a text, a degree of the effect on image quality (moire) due to the different scaling methods is small. Thus, in a case of a single-sided scan, the scaling method for obtaining a scaled image by changing the document feed speed of the ADF is selected, so that it is possible to improve the scanning productivity when originals composed mainly of a text are subjected to a single-sided scan.

In this manner, in the present embodiment, it is possible to achieve both an improvement in scanning productivity under a specified condition and a reduction of a difference in image quality between a single-sided scan and a double-sided scan. For example, when a type of original is specified as the specified original scan condition, to achieve both an improvement in scanning productivity and a reduction of a difference in image quality between a single-sided scan and a double-sided scan, the scaling methods of a single-sided original and a double-sided original are switched as follows.

When there is little difference in image quality due to the different scaling methods among scanned image data of originals, the scanning productivity of the single-sided scan is emphasized. In other words, the scaling method A is selected in a case of the single-sided scan, and the scaling method B is selected in a case of the double-sided scan. On the other hand, when there is a significant difference in image quality due to the different scaling methods among scanned image data of originals, a reduction of a difference in image quality between the single-sided scan and the double-sided scan is emphasized. In other words, the scaling method B is selected in both cases of the single-sided scan and the double-sided scan.

Figure 17:
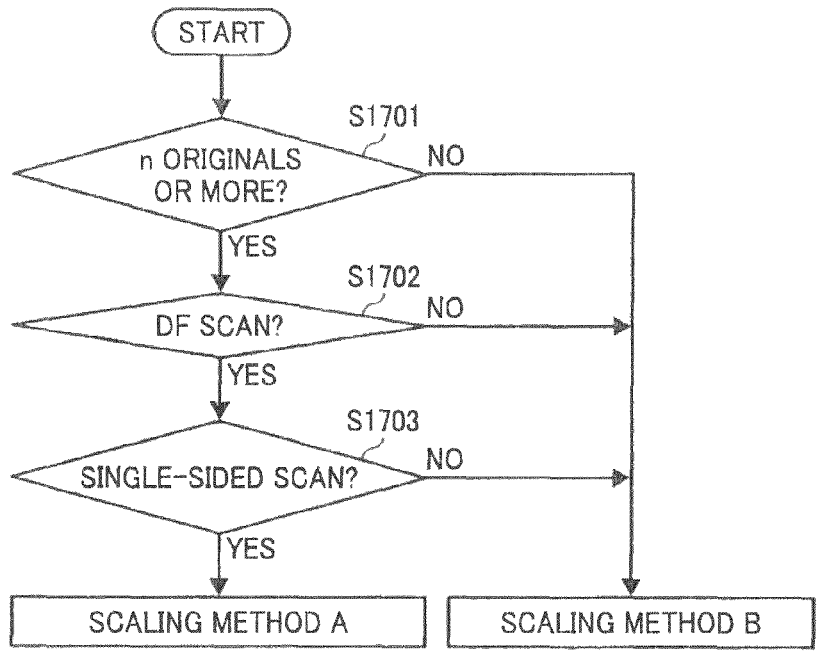
FIG. 17 is a flowchart of still another example of the operation of the image processing apparatus.

FIG. 17 illustrates an example of the operation of the image processing apparatus according to the present embodiment. In the present embodiment, the resolution specified by a user shall be 300 dpi. When the specified resolution is 300 dpi, there are two scaling methods as follows.

Scaling method A: Emphasis on productivity
Primary resolution changing unit: 50% scaling [scanning at 300 dpi] (2× speed)
Secondary resolution converting unit: 100% scaling
Scaling method B: Emphasis on image quality
Primary resolution changing unit: 100% scaling [scanning at 600 dpi] (1× speed)
Secondary resolution converting unit: 50% scaling An original scan condition for switching between the scaling methods in the present embodiment is the number of originals set in the original tray. In this example, when there are 50 originals or more, the scaling control is switched. An example of operation procedures until image data of the originals is obtained in the present embodiment is briefly described below.

First, a user specifies a scan resolution through the operating unit (not shown), and further specifies whether the originals are single-sided originals or double-sided originals through the operating unit. Then, the user sets a plurality of sheet-like originals in the original tray of the ADF, and sets the number of the originals through the operating unit. After that, the user presses the "SCAN START" button on the operation panel, and the image processing apparatus starts scanning the originals.

A case where the scaling method A is selected is explained below.

FIG. 15 is an explanatory diagram of an example of the case where the scaling method A is selected. It is assumed that the originals are single-sided originals, the resolutions of image data in the main scanning direction and the sub-scanning direction requested by the user are both 300 dpi, and the number of the originals set in the ADF is specified at 60 through the operating unit.

When informed that the number of the originals is 60 n through the operating unit, the resolution specifying unit 103 compares the number with 50 as a threshold of switching the scaling (Step S1701). In this example, the number of the originals is 60, and is larger than the threshold (YES at Step S1701), the resolution specifying unit 103 performs operation settings for the scaling method A.

The resolution specifying unit 103 sets the primary resolution changing unit 101 to control the ADF to feed the originals at the 2× speed. Furthermore, the resolution specifying unit 103 sets the secondary resolution converting unit 102 to perform 100% scaling in the sub-scanning direction. The originals fed one by one at the 2× speed are sequentially scanned, and scanned image data of each original is image data of 600 dpi (main scanning)×300 dpi (sub-scanning).

Then, the secondary resolution converting unit 102 does not perform scaling in the sub-scanning direction, but performs 50% scaling in the main scanning direction only on the image data (i.e., conversion of the resolution in the main scanning direction to 300 dpi) with the electrical circuit, and transfers image data of 300 dpi (main scanning)×300 dpi (sub-scanning) to the subsequent stage.

The scanning productivity at this time is about twice as high as the productivity in the scaling method B (emphasis on image quality) to be described later. In other words, the originals can be scanned in about half the time it takes in the scaling method B. Incidentally, the scanning productivity is not exactly twice as high as the productivity in the scaling method B because it takes some time to feed each original to the scan position and discharge the original in practice.

Subsequently, a case where the scaling method B is selected is explained below with reference to FIG. 16.

It is assumed that the resolutions of image data in the main scanning direction and the sub-scanning direction requested by the user are both 300 dpi, and the number of the originals set in the ADF is specified at 30 through the operating unit. When informed that the number of the originals is 30 through the operating unit, the resolution specifying unit 103 compares the number with 50 as the threshold of switching the scaling (Step S1701). In this example, the number of the originals is 30, and is smaller than the threshold (NO at Step S1701), the resolution specifying unit 103 performs operation settings for the scaling method B.

The resolution specifying unit 103 sets the primary resolution changing unit 101 to control the ADF to feed the originals at the 1× speed. Furthermore, the resolution specifying unit 103 sets the secondary resolution converting unit 102 to perform 50% scaling in the sub-scanning direction. The originals fed one by one at the 1× speed are sequentially scanned, and scanned image data of each original is image data of 600 dpi (main scanning)×600 dpi (sub-scanning). After the secondary resolution converting unit 102 performs 50% scaling on the image data to convert the image data into image data of 300 dpi (main scanning)×300 dpi (sub-scanning), and transfers the image data of 300 dpi (main scanning)×300 dpi (sub-scanning) to the subsequent stage.

The scanning productivity at this time is about half the productivity in the scaling method A (emphasis on productivity) described above. In other words, it takes about twice as long to scan the originals as the time taken in the scaling method A. Incidentally, the scanning productivity is not exactly half the productivity in the scaling method A because it takes some time to feed each original to the scan position and discharge the original in practice.

When there are not many originals, it does not take long to scan all the originals. Therefore, the user does not have a particular concern about the scanning productivity, and prefers a small difference in image quality between a single-sided scan and a double-sided scan to the higher scanning productivity. However, when there are many originals, it is conceivable that some users put more emphasis on the scanning productivity than the difference in image quality.

In the present embodiment, when there are many originals, it is possible to respond to a need of a user who puts more emphasis on an improvement in scanning productivity than a reduction of the difference in image quality between single-sided and double-sided, and thus it is possible to improve user-friendliness.

Figure 18:
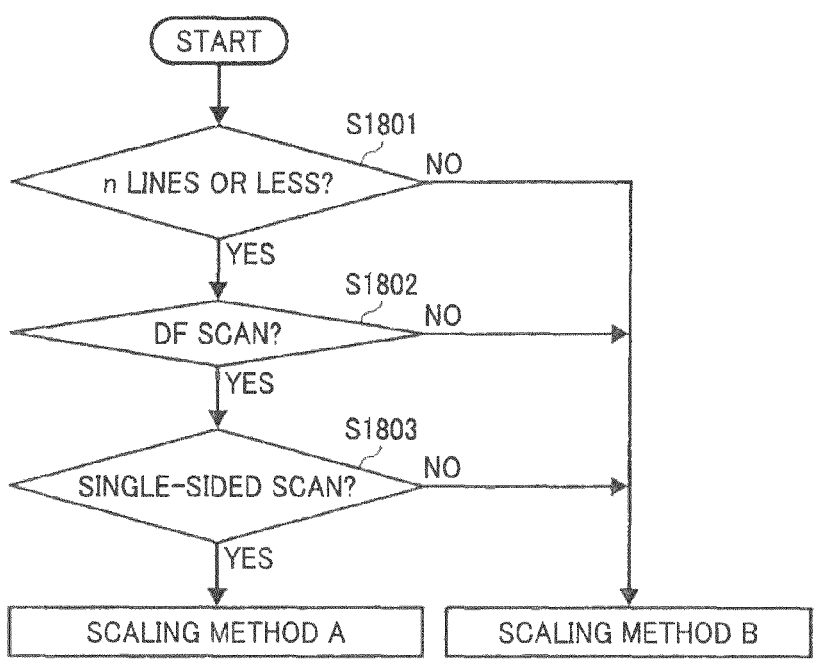
FIG. 18 is a flowchart of still another example of the operation of the image processing apparatus.

FIG. 18 illustrates an example of the operation of the image processing apparatus according to the present embodiment. In the present embodiment, the resolution specified by a user shall be 300 dpi. When the specified resolution is 300 dpi, there are two scaling methods as follows.

Scaling method A: Emphasis on productivity
   Primary resolution changing unit: 50% scaling [scanning at 300 dpi] (2× speed)
   Secondary resolution converting unit: 100% scaling
Scaling method B: Emphasis on image quality
   Primary resolution changing unit: 100% scaling [scanning at 600 dpi] (1× speed)
   Secondary resolution converting unit: 50% scaling An original scan condition for switching between the scaling methods in the present embodiment is a screen ruling of an original, i.e., the number of lines per inch.

In this example, when a screen ruling of an original is 150 lines or more, the scaling control is switched. An example of operation procedures until image data of the original is obtained in the present embodiment is briefly described below.

First, before an original is scanned, a user determines a screen ruling of the original with a screen-ruling determining unit by pre-scanning a halftone photo of the original in advance. The screen ruling is determined, for example, by using a detection method disclosed in Japanese Patent No. 3093235. Then, the user specifies a scan resolution through the operating unit (not shown), and further specifies whether the original is a single-sided original or a double-sided original through the operating unit. Subsequently, the user sets a plurality of sheet-like originals in the original tray of the ADF, and sets the number of the originals through the operating unit. After that, the user presses the "SCAN START" button on the operation panel, and the image processing apparatus starts scanning the originals.

A case where the scaling method A is selected is explained below with reference to FIG. 15.

It is assumed that the originals are single-sided originals, the resolutions of image data in the main scanning direction and the sub-scanning direction requested by the user are both 300 dpi, and the originals set in the ADF are to be scanned.

First, before the originals are scanned, the user pre-scans a halftone photo of each of the originals in advance to determine a screen ruling of each of the originals, and holds a result of the determination. In this example, it shall be determined that the screen ruling is 100 lines. The resolution specifying unit 103 compares the result of the determination of the screen ruling with 150 lines as a threshold of switching the scaling (Step S1801). In this example, the 100 lines is smaller than the threshold (YES at Step S1801), the resolution specifying unit 103 performs operation settings for the scaling method A.

The resolution specifying unit 103 sets the primary resolution changing unit 101 to control the ADF to feed the originals at the 2× speed. Furthermore, the resolution specifying unit 103 sets the secondary resolution converting unit 102 to perform 100% scaling in the sub-scanning direction. The originals fed one by one at the 2× speed are sequentially scanned, and scanned image data of each original is image data of 600 dpi (main scanning)×300 dpi (sub-scanning).

Then, the secondary resolution converting unit 102 does not perform scaling in the sub-scanning direction, but performs 50% scaling in the main scanning direction only on the image data (i.e., conversion of the resolution in the main scanning direction to 300 dpi) with the electrical circuit, and transfers image data of 300 dpi (main scanning)×300 dpi (sub-scanning) to the subsequent stage.

The scanning productivity at this time is about twice as high as the productivity in the scaling method B (emphasis on image quality) to be described later. In other words, the originals can be scanned in about half the time it takes in the scaling method B. Incidentally, the scanning productivity is not exactly twice as high as the productivity in the scaling method B because it takes some time to feed each original to the scan position and discharge the original in practice.

Subsequently, a case where the scaling method B is selected is explained below with reference to FIG. 16.

It is assumed that the originals are single-sided originals, the resolutions of image data in the main scanning direction and the sub-scanning direction requested by the user are both 300 dpi, and the originals set in the ADF are to be scanned.

First, before the originals are scanned, the user pre-scans a halftone photo of each of the originals in advance to determine a screen ruling of each of the originals, and holds a result of the determination. In this example, it shall be determined that the screen ruling is 200 lines. The resolution specifying unit 103 compares the result of the determination of the screen ruling with 150 lines as the threshold of switching the scaling (Step S1801). In this example, the 200 lines is larger than the threshold (NO at Step S1801), the resolution specifying unit 103 performs operation settings for the scaling method B.

The resolution specifying unit 103 sets the primary resolution changing unit 101 to control the ADF to feed the originals at the 1× speed. Furthermore, the resolution specifying unit 103 sets the secondary resolution converting unit 102 to perform 50% scaling in the sub-scanning direction. The originals fed one by one at the 1× speed are sequentially scanned, and scanned image data of each original is image data of 600 dpi (main scanning)×600 dpi (sub-scanning).

Then, the secondary resolution converting unit 102 performs 50% scaling in the main scanning direction and the sub-scanning direction on the image data (i.e., conversion of the resolutions in the main scanning direction and the sub-scanning direction to 300 dpi), and transfers image data of 300 dpi (main scanning)×300 dpi (sub-scanning) to the subsequent stage.

The scanning productivity at this time is about half the productivity in the scaling method A (emphasis on productivity) described above. In other words, it takes about twice as long to scan the originals as the time taken in the scaling method A. Incidentally, the scanning productivity is not exactly half the productivity in the scaling method A because it takes some time to feed each original to the scan position and discharge the original in practice.

As an example of an original that is prone to a difference in image quality (appearance of moire) when the scaling method is switched between a single-sided scan and a double-sided scan, a halftone photo is described above. However, the halftone photo does not always have such a difference in image quality due to the different scaling methods between the single-sided scan and the double-sided scan. The effect varies depending on the number of lines of dots composing the halftone photo, to be exact. The more the number of lines, the less the appearance of moire. Thus, it is possible to reduce a degree of the effect on image quality due to the different scaling methods between the single-sided scan and the double-sided scan. In a case of a halftone photo with a high screen ruling, the halftone photo can be treated like an original composed mainly of a text, and thus it is possible to improve the scanning productivity in the single-sided scan.

In the present embodiment, it is possible to improve the scanning productivity when a halftone photo with a high screen ruling is subjected to a single-sided scan.

(Fifth Embodiment)

Figure 19:
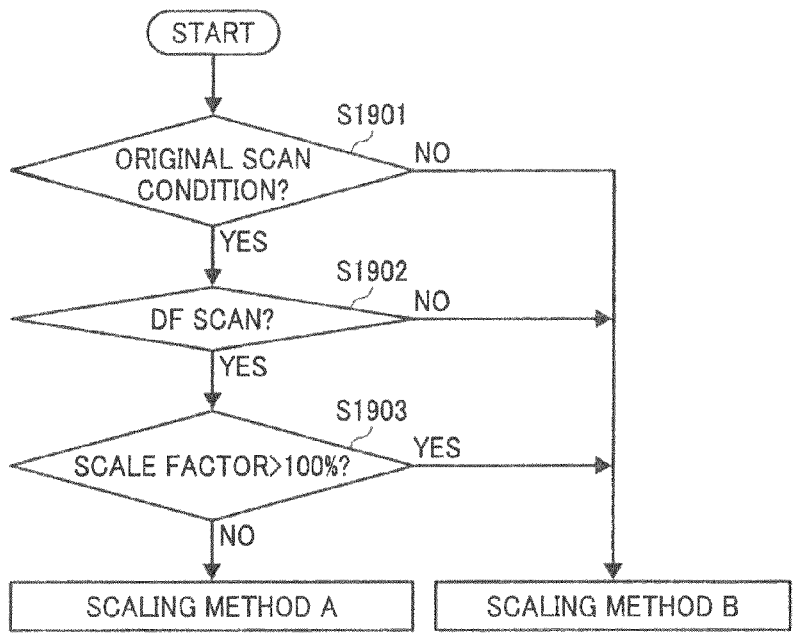
FIG. 19 is a flowchart of still another example of the operation of the image processing apparatus.

FIG. 19 illustrates an example of the operation of the image processing apparatus according to the present embodiment. In the present embodiment, the resolution specified by a user shall be 1200 dpi. When the specified resolution is 1200 dpi, there are two scaling methods as follows.

Scaling method A: Emphasis on productivity
   Primary resolution changing unit: 200% scaling [scanning at 1200 dpi] (0.5× speed)
   Secondary resolution converting unit: 100% scaling
Scaling method B: Emphasis on image quality
   Primary resolution changing unit: 100% scaling [scanning at 600 dpi] (1× speed)
   Secondary resolution converting unit: 200% scaling An original scan condition for switching between the scaling methods in the present embodiment is a type of original. An example of operation procedures until image data of the original is obtained in the present embodiment is briefly described below.

First, a user selects a scan resolution and a type of original through the operating unit (not shown), and specifies whether the original is a single-sided original or a double-sided original through the operating unit. Then, the user sets a plurality of sheet-like originals in the original tray of the ADF. After that, the user presses the "SCAN START" button on the operation panel, and the image processing apparatus starts scanning the originals.

A case where the scaling method B is selected is explained below with reference to FIG. 16.

It is assumed that the resolutions of image data in the main scanning direction and the sub-scanning direction requested by the user are both 1200 dpi, the text mode is specified as a type of original, and the single-sided originals set in the ADF are to be scanned.

The resolution specifying unit 103 compares 1200 dpi as the specified resolution received through the operating unit with 600 dpi as a threshold of switching the scaling (Step S1903). As 1200 dpi is larger than the threshold (YES at Step S1903), the resolution specifying unit 103 performs operation settings for the scaling method B.

The resolution specifying unit 103 sets the primary resolution changing unit 101 to control the ADF to feed the originals at the 1× speed. Furthermore, the resolution specifying unit 103 sets the secondary resolution converting unit 102 to perform 200% scaling in the sub-scanning direction. The originals fed one by one at the 1× speed are sequentially scanned, and scanned image data of each original is image data of 600 dpi (main scanning)×600 dpi (sub-scanning).

Then, the secondary resolution converting unit 102 performs 200% scaling in the main scanning direction and the sub-scanning direction on the image data (i.e., conversion of the resolutions in the main scanning direction and the sub-scanning direction to 1200 dpi) with the electrical circuit, and transfers image data of 1200 dpi (main scanning)×1200 dpi (sub-scanning) to the subsequent stage.

The scanning productivity at this time is about twice as high as the productivity in the scaling method A. In other words, the originals can be scanned in about half the time it takes in the scaling method A. Incidentally, the scanning productivity is not exactly twice as high as the productivity in the scaling method A because it takes some time to feed each original to the scan position and discharge the original in practice.

Figure 20:
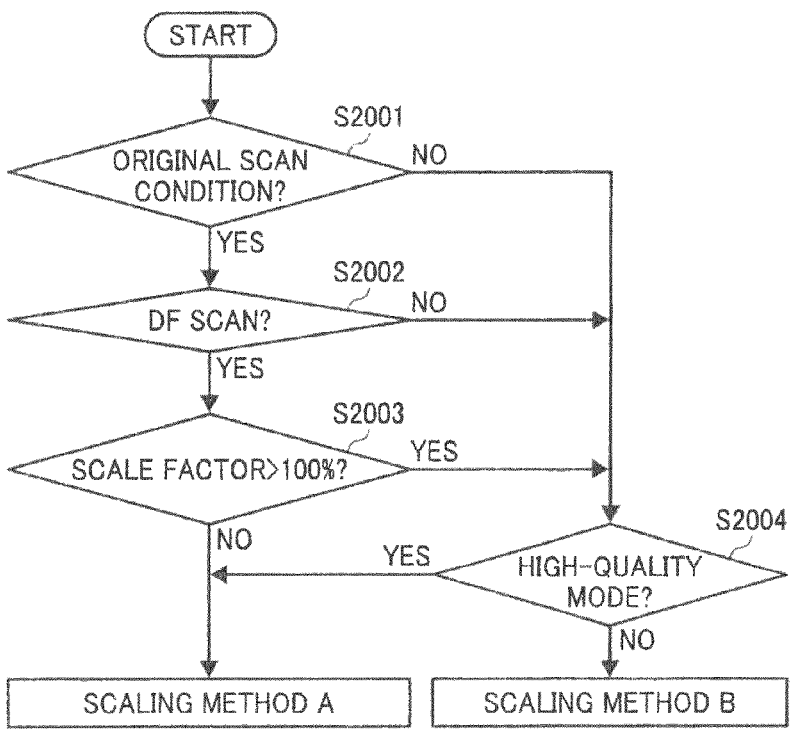
FIG. 20 is a flowchart of still another example of the operation of the image processing apparatus.

FIG. 20 illustrates another example of the operation of the image processing apparatus according to the present embodiment. A case where the scaling method A is selected is explained below with reference to FIGS. 15 and 20.

It is assumed that the resolutions of image data in the main scanning direction and the sub-scanning direction requested by the user are both 1200 dpi, the text mode is specified as a type of original, and a high-quality mode is specified when the single-sided originals set in the ADF are scanned.

The resolution specifying unit 103 compares 1200 dpi as the specified resolution received through the operating unit with 600 dpi as the threshold of switching the scaling (Step S2003). Furthermore, the resolution specifying unit 103 determines whether it is in the high-quality mode (Step S2004). In this example, an enlargement-scaling high-quality mode is specified (YES at Step S2004), so that the resolution specifying unit 103 performs operation settings for the scaling method A.

The resolution specifying unit 103 sets the primary resolution changing unit 101 to control the ADF to feed the originals at the 0.5× speed. Furthermore, the resolution specifying unit 103 sets the secondary resolution converting unit 102 to perform 100% scaling in the sub-scanning direction. The originals fed one by one at the 0.5× speed are sequentially scanned, and scanned image data of each original is image data of 600 dpi (main scanning)×1200 dpi (sub-scanning).

Then, the secondary resolution converting unit 102 does not perform scaling in the sub-scanning direction, but performs 200% scaling in the main scanning direction only on the image data (i.e., conversion of the resolution in the main scanning direction to 1200 dpi) with the electrical circuit, and transfers image data of 1200 dpi (main scanning)×1200 dpi (sub-scanning) to the subsequent stage.

The scanning productivity at this time is about half the productivity of the operation in the scaling method B described above. In other words, it takes about twice as long to scan the originals as the time taken in the scaling method B. Incidentally, the scanning productivity is not exactly half the productivity of the operation in the scaling method B because it takes some time to feed each original to the scan position and discharge the original in practice.

In the present embodiment, it is possible to solve the problem in the above first to fourth embodiments that: although the scanning productivity in reduction scaling, as a specific original scan condition, can be improved, the scanning productivity in enlargement scaling is decreased.

Furthermore, in the example of the operation when the scaling method B is selected in the present embodiment, although the productivity in a single-sided scan, as a specific original scan condition, can be improved, the original cannot be scanned with the resolution increased under normal circumstances because the scan resolution corresponds to a scan at the same magnification. Moreover, there still remains an issue that it is not yet possible to meet a user need for a scan at a substantial scan resolution (a high resolution) rather than an improvement in productivity. However, by providing an option of an emphasis on the resolution, it becomes possible to meet the need for the scan at the substantial scan resolution rather than the improvement in productivity.

Incidentally, the present invention can be realized in the form of a computer program that causes the CPU 16 to execute each of the processes shown in the flowcharts in the drawings. As a computer-readable recording medium storing therein the computer program, a semiconductor storage device, an optical and/or magnetic storage device, and the like can be used. Such computer program and recording medium can be used in, for example, a system having a different configuration from those in the above embodiments. By causing a CPU of the system to execute the computer program, substantially the same effect as the present invention can be obtained.

The exemplary embodiments of the present invention are concretely explained above. However, the present invention is not limited to the image processing apparatus described above. It goes without saying that various changes and modifications can be made without departing from the spirit and scope of the invention.

According to an aspect of the present invention, it is possible to achieve both an improvement in scanning productivity and a reduction of a difference in image quality between a single-sided scan and a double-sided scan.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus to scan original documents received via an automatic document feeder in a feed/scan mode, the image processing apparatus comprising:
    an operating unit configured to receive an input;
    a first scanning unit configured to scan a front side of an original document when performing single-sided scanning and when performing double-sided scanning; and
    a second scanning unit configured to scan a back side of the original document when performing the double-sided scanning,
    wherein, when performing the double-sided scanning, the front and back sides of the original document are scanned during a single feed of the original document,
    when performing the double-sided scanning, the first scanning unit and the second scanning unit scan the original document based on a first scaling method,
    the first scanning unit uses a second scaling method different from the first scaling method when an original scan condition associated with the original document is satisfied, and
    the first scanning unit uses the first scaling method when the original scan condition associated with the original document is not satisfied.

2. The image processing apparatus according to claim 1, wherein the first scanning unit switches between the first scaling method and the second scaling method based on the original scan condition associated with the original document, the second scaling method including obtaining a first scaled image of scanned image data by changing a document feed speed of the automatic document feeder, and the first scaling method including obtaining a second scaled image of scanned image data using a scaling processing circuit without changing the document feed speed of the automatic document feeder.

3. The image processing apparatus according to claim 1, wherein the operating unit is configured to receive as the input a selection of a type of the original document, and the original scan condition associated with the original document is the selected type of the original document received as the input to the operating unit.

4. The image processing apparatus according to claim 1, further comprising an original-number determining unit configured to determine a number of original documents provided for the automatic document feeder, wherein the original scan condition associated with the original document is the determined number of original documents provided for the automatic document feeder.

5. The image processing apparatus according to claim 1, further comprising a screen-ruling determining unit configured to determine a screen ruling of the original document, wherein the original scan condition associated with the original document is the determined screen ruling of the original document.

6. The image processing apparatus according to claim 2, wherein the operating unit is configured to receive as the input a selected resolution for scanning the original document, and when the selected resolution received by the operating unit is greater than 100%, the first scanning unit selects the first scaling method regardless of whether the single-sided scanning or the double-sided scanning is to be performed.

7. The image processing apparatus according to claim 1, wherein the image processing apparatus has a quality mode, in which the original document is scanned at a first resolution if the original document undergoes an enlargement scan, the first resolution being greater than a second resolution where the original document does not undergo the enlargement scan, and when the image processing apparatus is in the quality mode and performs the single-sided scanning, the operating unit receives as the input a selection regarding whether to change a scaling method of the first scanning unit to the second scaling method.

8. An image processing method implemented on an image processing apparatus configured to scan original documents received via an automatic document feeder in a feed/scan mode and that includes an operating unit configured to receive an input, a first scanning unit configured to scan a front side of an original document when performing single-sided scanning and when performing double-sided scanning, and a second scanning unit configured to scan a back side of the original document when performing the double-sided scanning, the image processing method comprising:

performing double-sided scanning of the original document with the first scanning unit and the second scanning unit based on a first scaling method;

scanning the original document with the first scanning unit using a second scaling method different from the first scaling method when an original scan condition associated with the original document is satisfied; and scanning the original document with the first scanning unit using the first scaling method when the original scan condition associated with the original document is not satisfied, wherein, when performing the double-sided scanning, the front and back sides of the original document are scanned during a single feed of the original document.

9. The image processing method according to claim 8, wherein the first scanning unit switches between the first scaling method and the second scaling method based on the original scan condition associated with the original document, the second scaling method including obtaining a first scaled image of scanned image data by changing a document feed speed of the automatic document feeder, and the first scaling method including obtaining a second scaled image of scanned image data using a scaling processing circuit without changing the document feed speed of the automatic document feeder.

10. The image processing method according to claim 8, further comprising receiving as the input to the operating unit a selection of a type of the original document, wherein the original scan condition associated with the original document is the selected type of the original document received as the input to the operating unit.

11. The image processing method according to claim 8, further comprising determining a number of original documents provided for the automatic document feeder, wherein the original scan condition associated with the original document is the determined number of original documents provided for the automatic document feeder.

12. The image processing method according to claim 8, further comprising determining a screen ruling of the original document, wherein the original scan condition associated with the original document is the determined screen ruling of the original document.

13. The image processing method according to claim 9, further comprising receiving as the input to the operating unit a selected resolution for scanning the original document, wherein, when the selected resolution received for said receiving is greater than 100%, the first scanning unit selects the first scaling method regardless of whether the single-sided scanning or the double-sided scanning is to be performed.

14. The image processing method according to claim 8, wherein the image processing apparatus has a quality mode, in which the original document is scanned at a first resolution if the original document undergoes an enlargement scan, the first resolution being greater than a second resolution where the original document does not undergo the enlargement scan, and when the image processing apparatus is in the quality mode and performs the single-sided scanning, the operating unit receives as the input a selection regarding whether to change a scaling method of the first scanning unit to the second scaling method.

15. The image processing apparatus according to claim 1, wherein the input to the operating unit is based on a received user selection to set the original scan condition associated with the original document.

16. The image processing apparatus according to claim 2, wherein the first scaled image is obtained based on one of a scale up and a scale down operation.

17. The image processing apparatus according to claim 2, wherein the second scaled image is obtained based on one of a scale up and a scale down operation.

18. The image processing method according to claim 8, wherein the input to the operating unit is based on a received user selection to set the original scan condition associated with the original document.

19. The image processing method according to claim 9, wherein the first scaled image is obtained based on one of a scale up and a scale down operation.

20. The image processing method according to claim 9, wherein the second scaled image is obtained based on one of a scale up and a scale down operation.

\* \* \* \* \*